W. E. DANAT.
CLOSURE FOR CONTAINERS.
APPLICATION FILED MAY 9, 1911.

1,016,739.

Patented Feb. 6, 1912.

Inventor
Wilmer E. Danat.

Witnesses

By Victor J. Evans.
Attorney

UNITED STATES PATENT OFFICE.

WILMER E. DANAT, OF BUFFALO, NEW YORK.

CLOSURE FOR CONTAINERS.

1,016,739.   Specification of Letters Patent.   Patented Feb. 6, 1912.

Application filed May 9, 1911. Serial No. 626,001.

*To all whom it may concern:*

Be it known that I, WILMER E. DANAT, a citizen of the United States, residing at Buffalo, in the county of Erie and State of New York, have invented new and useful Improvements in Closures for Containers, of which the following is a specification.

An object of the invention is to provide a closure for containers such as milk bottles and the like, whereby the contents of the container will be prevented from flowing out of the same when the closure is in closing position and whereby the closure can be quickly and easily removed from the container to permit of pouring the contents therefrom.

To accomplish the desired result, use is made of a wafer adapted to seat on the upper end of the container to close the opening therein, the said wafer having an inclined slit formed therein, the angularity of the sides forming the slit being so arranged that when the container is inverted the contents thereof pressing against one side of the slit will tend to close the slit and prevent the exit of the contents of the container and the said slit being so positioned that a knife blade or similar article can be inserted therein and by means of pressure the closure can be removed from engagement with the container.

In a large number of the closures now used on milk bottles and the like, great trouble is experienced in removing the closure from the bottle in that by exerting a pressure on the closure to remove the same the closure is torn or destroyed and it is necessary to provide a new closure for the bottle.

A further disadvantage in a large number of the closures now employed lies in the fact that they do not entirely close the openings of the containers to which they are applied and the contents of the container tends to leak therefrom.

In my device I aim to provide a simple, efficient and durable closure which can easily be applied to the container by simply pressing the closure into engagement with the container and which can be quickly removed therefrom although while positioned on the container the closure prevents the exit of the contents of the container.

Reference is to be had to the accompanying drawings constituting a part of this specification, in which similar characters of reference denote corresponding parts in all the views, and in which—

Figure 1:
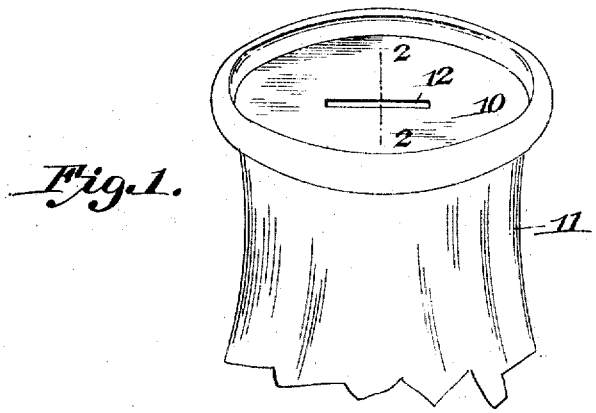
Figure 2:
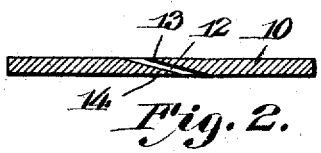
Figure 3:
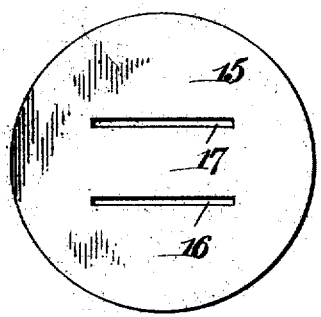
Figure 4:
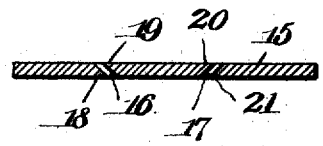

Figure 1 is a fragmentary perspective view of a container showing my closure applied thereto. Fig. 2 is a vertical section taken through the closure substantially on the line 2—2 in Fig. 1. Fig. 3 is a plan view of the modified form of closure. Fig. 4 is a vertical sectional view of the closure shown in Fig. 3.

Referring to the views and more particularly to Figs. 1 and 2, I provide a wafery cap 10 adapted to be positioned over the opening of a container 11 to close the same, the said cap being positioned to repose on an integral flange of the container and being pressed into frictional engagement with the said flange so that the contents of the container will be prevented from leaking out between the container and the edge of the cap 10. The cap 10 is provided with an inclined slit 12 formed by making a cut in the wafery cap 10 so that the sides 13, 14 of the slit 12 will extend at an angle to the upper and lower surfaces of the cap 10 as shown in Fig. 2.

Now assuming that the container 11 has been filled with a fluid such as milk or the like and that the cap 10 has been positioned on the container as mentioned, when the container is inverted the fluid will press against the under surface of the cap 10 thus pressing the side 14 against the side 13 and substantially closing the slit 12 so that the fluid in the container cannot flow outwardly through the slit 12, it being understood that the slit 12 is of a size equal to the edge of a knife blade. When it is desired to remove the cap 10 from the container 11, a knife blade is angularly inserted in the slit 12 and by pressing downwardly on the outer end of the knife blade or the handle thereof, an edge of the cap will be disengaged from the container and then by pulling upwardly on the knife blade against the side 13, the entire cap will be disengaged from the container so that the contents thereof can be poured therefrom through the opening normally closed by the cap.

In Figs. 3 and 4 I disclose a modified form of my device and in which I provide a wafery cap 15, substantially similar to the cap 10 shown in Fig. 1 and the cap 15 is provided with parallel slits 16, 17, having sides 18 and 19 and 20, 21 respectively; the slits 16 and 17 being formed at an angle to the upper and lower surfaces of the cap and relatively extending downwardly in a converging direction as shown in Fig. 4, the said slits 16 and 17 being spaced a slight distance apart. By providing a plurality of spaced slits in the cap 15 the knife blade can be inserted in one of the slits and then bent to extend slightly through the second slit so that the cap in its entirety can be, in one movement of the knife blade, removed from the container.

It will be understood that should the container for any reason be inverted when the cap is positioned thereon, the pressure of the fluid in the container on the under side of the cap will tend to press the sides 18 and 21 against the sides 19 and 20 respectively, thus substantially closing the slits 16 and 17 and preventing the exit of the contents of the container as has been heretofore mentioned in connection with the structure shown in Figs. 1 and 2. It will be readily seen that by disposing the slits at an angle to the horizontal plane of the cap, a more efficient device is provided than would be the result if the slits were provided in the cap at right angles to the horizontal plane thereof in that the knife blade or other article would have to be inserted vertically through the slits and the outer end thereof would tend to come in contact with the contents of the container while at the same time any pressure on the cap from either side thereof would not tend to close the slits as is the case when the slits are positioned at an angle relatively to the cap.

Having thus fully described the invention, what I claim as new, is:—

1. A closure for containers comprising a wafery cap for engagement with the container to normally close the opening thereof, the said cap having an inclined slit bounded by sides extended at an angle to the plane of the cap.

2. In a closure for containers, a wafery cap for engagement with the container to close the opening thereof, the said cap being removable from the said container and having a plurality of spaced converging parallel slits, each of the said slits bounded by parallel sides extending angularly to the plane of the cap.

3. A closure for containers comprising a wafery cap for engagement with the container to normally close the opening thereof, the said cap having a slit bounded by sides extended at an angle to the plane of the cap with the mentioned sides normally adapted to engage when the cap is positioned on the container.

In testimony whereof I affix my signature in presence of two witnesses.

WILMER E. DANAT.

Witnesses:
JOHNN U. PEEL,
GEORGE O. DANAT.